United States Patent
Wang et al.

(10) Patent No.: US 12,229,577 B2
(45) Date of Patent: Feb. 18, 2025

(54) VIRTUAL MACHINE FILE MANAGEMENT USING FILE-LEVEL SNAPSHOTS

(71) Applicant: INTERNATIONAL BUSINESS MACHINES CORPORATION, Armonk, NY (US)

(72) Inventors: Da Long Wang, Hangzhou (CN); Qin Yue Chen, Shanghai (CN); Xue Lian Feng, Ningbo (CN); Yang Liang, Beijing (CN); Yang Yang Feng, Ningbo (CN); Bin Xiong, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 838 days.

(21) Appl. No.: 17/238,604

(22) Filed: Apr. 23, 2021

(65) Prior Publication Data
US 2022/0342686 A1    Oct. 27, 2022

(51) Int. Cl.
*G06F 9/455*    (2018.01)
*G06F 16/11*   (2019.01)
*G06F 16/174*  (2019.01)

(52) U.S. Cl.
CPC ........ *G06F 9/45558* (2013.01); *G06F 16/128* (2019.01); *G06F 16/174* (2019.01);
(Continued)

(58) Field of Classification Search
CPC ...... G06F 9/45; G06F 9/45558; G06F 16/128; G06F 16/147; G06F 2009/45583;
(Continued)

(56) References Cited

U.S. PATENT DOCUMENTS 6,823,376 B1 * 11/2004 George ................ H04L 67/306
                                                        709/200
7,389,313 B1 *  6/2008 Hsieh .................. G06F 11/2071
(Continued)

FOREIGN PATENT DOCUMENTS

CN    107908755 A    4/2018
WO   2016137524 A1   9/2016

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.
(Continued)

*Primary Examiner* — Mehran Kamran
(74) *Attorney, Agent, or Firm* — CUENOT, FORSYTHE & KIM, LLC

(57) ABSTRACT

VM file management includes detecting a user request to access to a virtual machine (VM) and searching a predefined list to determine whether the user requesting access is identified on the list. If so, a file-level snapshot is generated prior to enabling modification of a VM file by the user. The file-level snapshot includes a user attribute and is added as the top layer of a stack. The user attribute indicates a role of the user for whom the file-level snapshot is created. Each layer of the stack contains one or more other file-level snapshots. The VM file is written in the file's entirety to the snapshot in response to the user modifying the VM file. Based on the user attribute of each snapshot, a set of snapshots is selected from the stack, and the VM is modified by merging the VM files belonging to the set of snapshots selected.

20 Claims, 6 Drawing Sheets

(52) U.S. Cl.
CPC .............. *G06F 2009/45583* (2013.01); *G06F 2009/45591* (2013.01)

(58) Field of Classification Search
CPC ........... G06F 2009/45591; G06F 16/11; G06F 16/84; G06F 16/174
USPC ...................................... 718/1; 707/649, 639
See application file for complete search history.

(56) References Cited

U.S. PATENT DOCUMENTS

| | | | | |
|---|---|---|---|---|
| 8,239,526 | B2* | 8/2012 | Simpson | ................. H04L 43/08 709/224 |
| 8,516,480 | B1* | 8/2013 | Epstein | ............... G06F 9/45558 718/1 |
| 8,799,709 | B2* | 8/2014 | Iikura | ................. G06F 11/1415 714/21 |
| 9,223,962 | B1* | 12/2015 | Kashyap | .................. G06F 21/52 |
| 10,114,564 | B2 | 10/2018 | Jain et al. | |
| 10,249,014 | B2 | 4/2019 | Bala et al. | |
| 10,514,989 | B1 | 12/2019 | Borodin et al. | |
| 2012/0259815 | A1* | 10/2012 | Olson | ................. G06F 11/1464 707/649 |
| 2012/0290802 | A1* | 11/2012 | Wade | .................... G06F 16/128 711/E12.103 |
| 2013/0117515 | A1* | 5/2013 | Ashmore | ............ G06F 11/3433 711/162 |
| 2014/0095817 | A1* | 4/2014 | Hsu | ......................... G06F 3/065 711/162 |
| 2014/0258238 | A1* | 9/2014 | Jin | ...................... G06F 9/45558 707/649 |
| 2015/0378849 | A1* | 12/2015 | Liu | ........................ G06F 16/188 711/162 |
| 2018/0143883 | A1 | 5/2018 | Bryant et al. | |
| 2019/0044945 | A1* | 2/2019 | Kundu | ................ H04L 63/1408 |
| 2019/0155598 | A1 | 5/2019 | Bainville et al. | |
| 2020/0073852 | A1 | 3/2020 | Ramachandran et al. | |

OTHER PUBLICATIONS

WIPO Appln. No. PCT/CN2022/077838 International Search Report and Written Opinion, May 20, 2022, 9 pg.

"Logical volume management," [online] Wikipedia, the Free Encyclopedia, Dec. 22, 2020, retrieved from the Internet: <https://en.wikipedia.org/wiki/Logical_volume_management>, 5 pg.

"Btrfs," [online] Wikipedia, the Free Encyclopedia, Apr. 4, 2021, retrieved from the Internet: <https://en.wikipedia.org/wiki/Btrfs>, 17 pg.

"OverlayFS," [online] Wikipedia, the Free Encyclopedia, Jan. 19, 2021, retrieved from the Internet: <https://en.wikipedia.org/wiki/OverlayFS>, 2 pg.

* cited by examiner

VIRTUAL MACHINE FILE MANAGEMENT USING FILE-LEVEL SNAPSHOTS

BACKGROUND

This disclosure relates to virtualization technology, and more particularly, to managing virtual machine (VM) files using version control of file-level snapshots.

Virtualization is a decades-old technology that nevertheless offers significant benefits to various types of users, both singly and as part of a network. The technology allows a single computer system (e.g., server) to host multiple VMs, each potentially running a different operating system. An advantage is that failure of one VM does not automatically bring down any others. On a virtualized system, different servers can run on different VMs thereby providing the functionality of a multicomputer at a lower cost and with easier maintainability. Another advantage of virtualization is checkpointing and migrating VMs (e.g., load balancing across multiple servers) are much easier than migrating processes running on a standard operating system.

Other advantages include running legacy applications on operating systems (or versions) that are no longer supported or operable on current hardware and enabling software developers to test an application's performance with different operating systems using VMs rather than using multiple computers running the various operating systems. The scalability of a virtual environment created with VMs is a particular advantage for enterprises in that virtualization enables an expanding enterprise to accommodate efficiently and rapidly the enterprise's need for increased IT capabilities.

During the lifetime of a VM, it can be useful to capture the different states of the VM at different times. One mechanism for doing so is by taking a snapshot that captures and electronically stores the different attributes of the current state of the VM at a specific point-in-time. Snapshots are typically implemented at the block level, with each snapshot storing only those blocks of data that have been modified. The block-level snapshot does not capture a file in the file's entirety. Which modified blocks belong to which files cannot be determined with block-level snapshots.

Block-level snapshots are thus problematic in several respects, including in the context of installing patches to update or correct deficiencies in the VM operating system. Block-level snapshots can preclude or limit the ability to separate files modified by patches installed by an IT administrator from VM file modifications made by other types of users (e.g., developers, routine VM users). In the event that the state of a VM needs to be rolled back to a prior state, the rollback is typically performed without merging VM files captured by snapshots generated overtime. As a result, installed patches are lost and must be manually re-installed after every such rollback. This can be a substantial undertaking for an enterprise-wide or other large system which utilizes hundreds or even thousands of VMs. For example, maintaining IT security through the period installation of patches can necessitate IT administrators and VM users having to expend considerable time and energy in performing the repetitive task of manually re-installing patches after a VM rollback.

SUMMARY

In an example implementation, a computer-implemented process for managing virtual machine (VM) files using file-level snapshots and version control includes detecting an electronic request of a user requesting access to a VM. The process includes detecting an electronic request of a user requesting access to a virtual machine (VM) and searching a pre-defined list of users to determine whether the user requesting access is identified among the pre-defined list of users. The process includes generating a file-level snapshot at a top layer of a stack prior to enabling modification of a VM file by the user in response to identifying the user among the pre-defined list of users. The file-level snapshot includes a user attribute indicating a role of the user for whom the file-level snapshot is created and a timestamp indicating a time that the file-level snapshot is created. Each layer of the stack contains a file-level snapshot that includes one or more VM files in their entirety. The process includes responding to user input from the user modifying the VM file by saving to the file-level snapshot the VM file in the VM file's entirety, including portions modified by the user. The process includes selecting from the stack a set of file-level snapshots based on a user attribute of each file-level snapshot selected and modifying the VM by merging the VM files captured by the snapshots belonging to the set of file-level snapshots.

The computer-implemented process enables the monitoring of requests for access to the VM— for example, whether the request is from an IT administrator or VM user (e.g., developer, routine VM user)—as well as the creation of a file-level snapshot in response to each access request. Each file-level snapshot captures and stores the latest version of a VM file, in the VM file's entirety rather than only the modified blocks of the VM file. The computer-implemented process, through the request monitoring, further enables distinguishing modifications of VM files made in response to input from an IT administrator (e.g., patch installation) from those made in response to input from another type of VM user. That is, the computer-implemented process can differentiate or distinguish between and/or separate VM file modifications based on the respective roles of the users supplying the input.

Accordingly, in still another example implementation of the computer-implemented process, each of the snapshots selected for merging has a user attribute indicating that the role of the user for whom the snapshot selected was created is an IT administrator. The VM is modified by rolling back the VM to a prior state. The roll back is performed by merging only latest versions of VM file modifications made by one or more IT administrators and retaining all other VM files of the VM in an original unmodified state.

When there arises a need to rollback the VM to a prior state, the computer-implemented process can merge only those VM files modified by patches installed by one or more IT administrators. Modifications made by users in other roles are ignored in the merging of VM files. This allows the rollback of the VM to be accomplished without losing the installed patches, thereby obviating the need to manually re-install each of the patches and resulting in a saving in time and resources.

In another example implementation, a system for managing VM files using file-level snapshots and version control includes a processor configured to initiate operations. The operations include detecting an electronic request of a user requesting access to a virtual machine (VM) and searching a pre-defined list of users to determine whether the user requesting access is identified among the pre-defined list of users. The operations include generating a file-level snapshot at a top layer of a stack prior to enabling modification of a VM file by the user in response to identifying the user among the pre-defined list of users. The file-level snapshot includes a user attribute indicating a role of the user for whom the file-level snapshot is created and a timestamp indicating a time that the file-level snapshot is created. Each layer of the stack contains a file-level snapshot that includes one or more VM files in their entirety. The operations include responding to user input from the user modifying the VM file by saving to the file-level snapshot the VM file in the VM file's entirety, including portions modified by the user. The operations include selecting from the stack a set of file-level snapshots based on a user attribute of each file-level snapshot selected and modifying the VM by merging the VM files captured by the snapshots belonging to the set of file-level snapshots.

In yet another example implementation of the system for managing VM files using file-level snapshots and version control, each of the snapshots selected for merging has a user attribute indicating that the role of the user for whom the snapshot selected was created is an IT administrator. The VM is modified by rolling back the VM to a prior state. The roll back is performed by merging only latest versions of VM file modifications made by one or more IT administrators and retaining all other VM files of the VM in an original unmodified state.

In another example implementation, a computer program product includes one or more computer readable storage media, and program instructions collectively stored on the one or more computer readable storage media. The program instructions are executable by computer hardware to initiate operations. The operations include detecting an electronic request of a user requesting access to a virtual machine (VM) and searching a pre-defined list of users to determine whether the user requesting access is identified among the pre-defined list of users. The operations include generating a file-level snapshot at a top layer of a stack prior to enabling modification of a VM file by the user in response to identifying the user among the pre-defined list of users. The file-level snapshot includes a user attribute indicating a role of the user for whom the file-level snapshot is created and a timestamp indicating a time that the file-level snapshot is created. Each layer of the stack contains a file-level snapshot that includes one or more VM files in their entirety. The operations include responding to user input from the user modifying the VM file by saving to the file-level snapshot the VM file in the VM file's entirety, including portions modified by the user. The operations include selecting from the stack a set of file-level snapshots based on a user attribute of each file-level snapshot selected and modifying the VM by merging the VM files captured by the snapshots belonging to the set of file-level snapshots.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
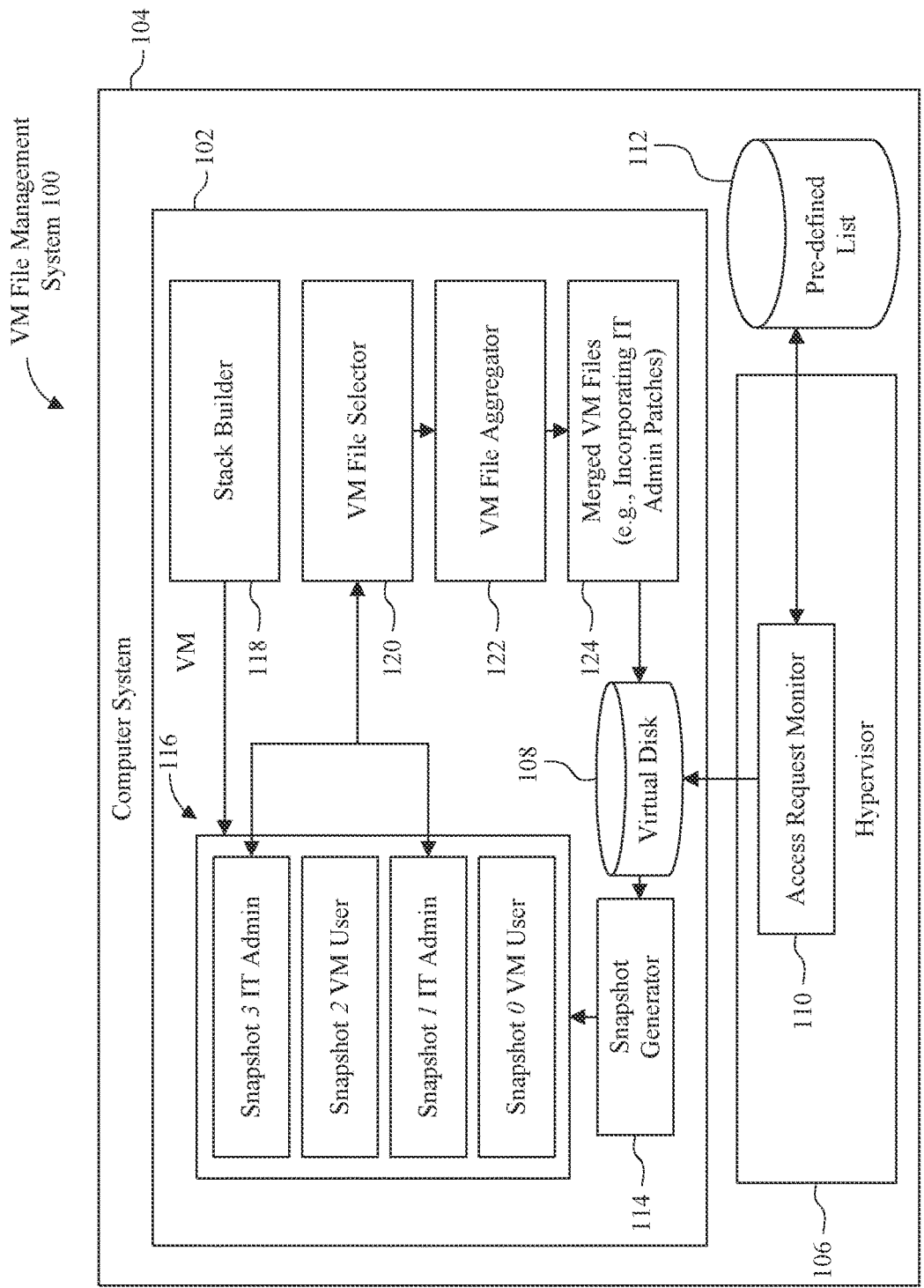
FIG. 1 is a block diagram illustrating an example system for managing VM files using file-level snapshots and version control.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to virtualization technology, and more particularly, to managing VM files using file-level snapshots and version control. A VM file comprises data that is electronically stored in multiple blocks of the disk space of a computer system. As defined herein, a "snapshot" is a data structure that records the state of a VM, including one or more VM files, at a specific point in time. Typical mechanisms for capturing VM file snapshots are implemented at the block level whereby each snapshot only stores blocks comprising data that has been modified, not the entire file. The block-level snapshot does not provide a logical link between modified blocks of data and the files to which the modified blocks belong.

The lack of a logical link can be problematic in several contexts. For example, during the lifetime of a VM, an IT administrator may install any number of patches to upgrade or correct flaws (e.g., security vulnerabilities) in the VM operating system. Block-level snapshots, however, provide no efficient mechanism for separating VM files modified by patch installations from VM files modified by one or more VM users in the ordinary course of working with one or more VM files. Accordingly, it is unlikely that only VM files modified by patch installations can be merged without also merging the VM files modified by VM users. The usual procedure for performing a VM rollback, therefore, is to perform the rollback without merging any snapshots, which results in the elimination of the installed patches. The patches must therefore be re-installed after every rollback of the VM. Thus, with respect to a virtualization environment comprising numerous VMs, achieving compliance with IT security, likely necessitates IT administrators and VM users having to spend inordinate amounts of time and resources in the repetitive tasks of repeatedly re-installing lost patches.

In accordance with the inventive arrangements described herein, example methods, systems, and computer program products are provided that efficiently manage and merge VM file modifications (including installation of IT administrator-provided patches) with version control of file-level snapshots. As defined herein, a "file-level snapshot" is a snapshot that captures and stores a VM file in the VM file's entirety. Using the file-level snapshots enhances and makes more flexible VM file management, enabling for example separation and isolation of VM files based on the role of a user (e.g., IT administrator or ordinary VM user) who modifies one or more VM files.

In one or more example implementations, a VM file management system includes an access request monitor (ARM) as well as the file-level snapshot features. The ARM monitors requests to access a VM and based on the access request determines whether a requestor is among a predefined list of users. The predefined list of users can include user attributes identifying different users who perform different roles (e.g., developer, routine VM user, IT administrator).

Based on a request to access a VM, the VM file management system identifies the user and/or the user's role (e.g., developer, routine VM user, IT administrator). If a user is identified among a predetermined list of users, then a file-level snapshot is generated prior to enabling modification of a VM file by the user. The file-level snapshot generated in response to the access request is initially empty. As defined herein, an "empty" snapshot is a data structure comprising only meta-data corresponding to a memory location, a user attribute corresponding to the user for whom the snapshot is created, and a timestamp corresponding to the time that the snapshot is created. The different states of a VM file modified over time can be saved by taking snapshots at different times, as indicated by corresponding snapshot timestamps. A snapshot of a VM file thus captures and stores a specific version of the VM file written to the snapshot at a specific time indicated by the corresponding timestamp. If the VM file is modified over time, each modified version can be written to a specific snapshot such that different snapshots can capture and save the different versions of the VM file. Each snapshot corresponds to the user for whom the snapshot is created as indicated by the snapshot's corresponding user attribute, which can identify the user's role (e.g., developer, routine VM user, IT administrator).

The file-level snapshot, though initially empty, is as an active snapshot. As defined herein, an "active snapshot" is a snapshot that supports both read and write operations of a computer. The active snapshot is added as the top layer of a stack of snapshots. File-level snapshots at lower layers below the top layer of the stack are read-only.

When, during a session initiated by the request to access the VM by a user identified by the ARM, the user modifies a VM file, the VM file as modified is captured and saved to the active file-level snapshot. The snapshot thus captures and stores the VM file, as modified by input from the user, in the VM file's entirety. That is, the snapshot captures and stores the entire VM file including portions of data modified by user input, rather than only the portions modified as with a block-level snapshot. As modified, the VM file captured by the snapshot is the latest version of the VM file. Each snapshot generated in response to an access request by an ARM-identified user captures and stores VM files modified by a specific user. For example, the same VM file may be modified both by an IT administrator and by a VM user. The modifications, however, are captured by two different snapshots. One snapshot captures and saves the modifications to the VM file made by the IT administrator. The other snapshot of the same VM file captures and saves the modifications to the VM file made by the VM user.

In one aspect, the VM file management system can modify a VM by merging selected snapshots from the stack. As defined herein, "merging" means saving or writing to the file system of the VM certain VM files saved in snapshots selected from the stack according to one or more specified criteria. The criteria can include the role of the users for whom the snapshots were created. For example, snapshots containing VM files modified by one or more IT administrators can be selected. Whenever there is a need to rollback a VM to an original state, only those VM files modified by IT administrator(s) patch installations are merged while those VM files modified by other VM user(s) are ignored or discarded. The determination of which VM files to merge is made based on identifying the role of the user that modified the VM files. VM files modified by a user identified as an IT administrator are merged during rollback while those made by an ordinary VM user are not.

During a rollback of the VM, the VM file management system supports both read and write operations, allowing selection of only snapshots created for a specific user or class of user, specifically the IT administrator or those assigned the role of IT administrator. As defined herein, the role of "IT administrator" is a role assigned to a user who is granted predefined privileges that allow the user, as a designated IT administrator, to install operating system files and patches for modifying operating system files. By contrast, other users are not granted such privileges and hence cannot install or modify system files. This enables, for example, the efficient merger of only VM files that have been modified by patch installations made by the IT administrator and without any modifications by another type of VM user (e.g., developer, routine VM user).

In another aspect, the VM file management system provides each snapshot with two attributes. The first attribute is a user attribute, which records for whom the snapshot is created. The second attribute is a time attribute, which is a timestamp indicating when the snapshot is created. Whenever a new snapshot is generated, the snapshot is added to the top layer of a stack of snapshots as an active snapshot. Only snapshot(s) in the top layer are active, supporting both read and write data operations. If a VM file changes (owing to a user's modifications) while the snapshot is active, then the snapshot, as a file-level snapshot, stores the entire VM file as the latest version of the VM file. If multiple versions of a VM file exist among the VM file system and selected snapshots, only the latest versions are merged. All other versions can be deleted to reclaim the corresponding data storage space.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

Figure 2:
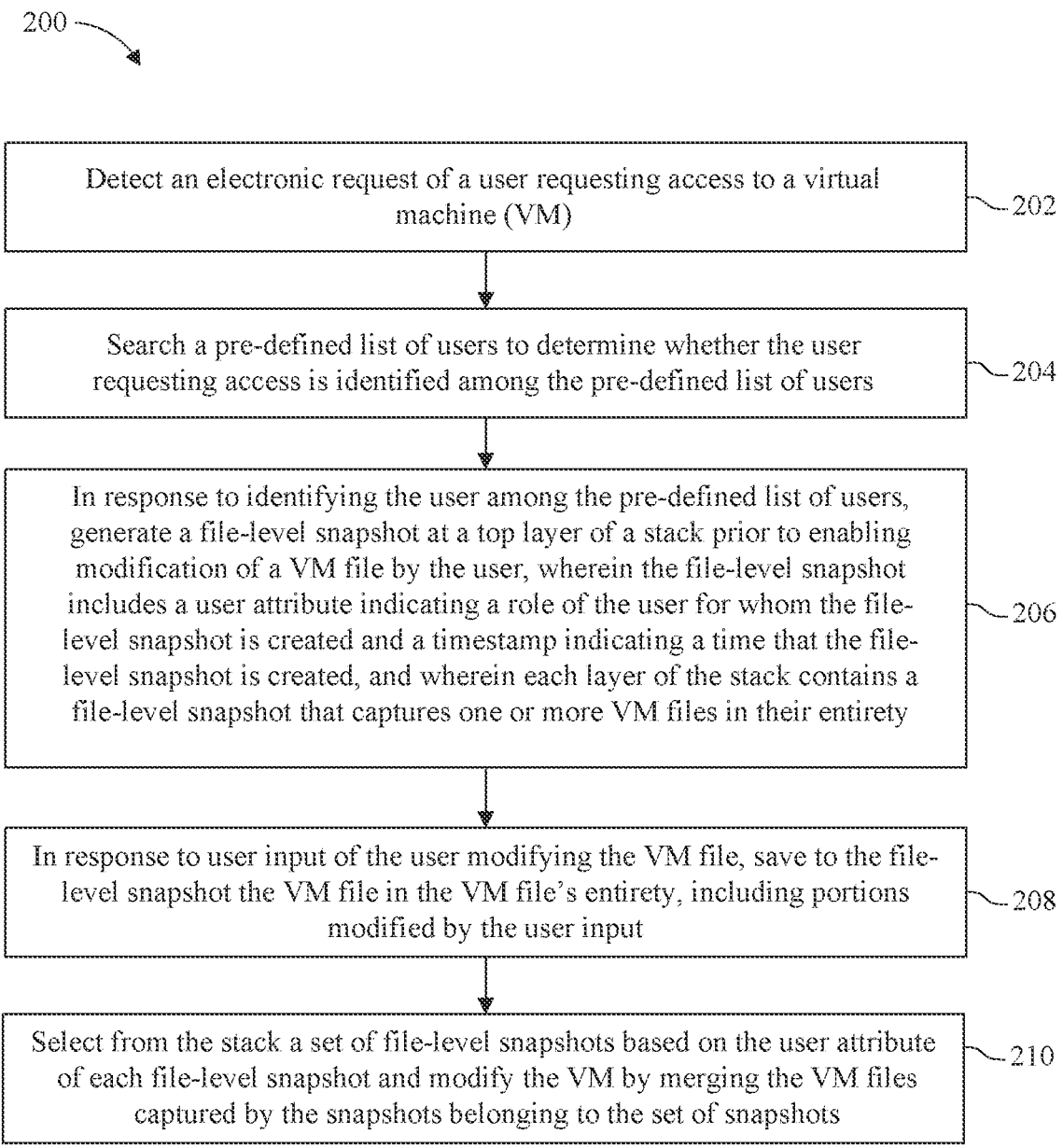
FIG. 2 is a flow chart illustrating an example process for managing VM files using the system of FIG. 1.
Figure 4:
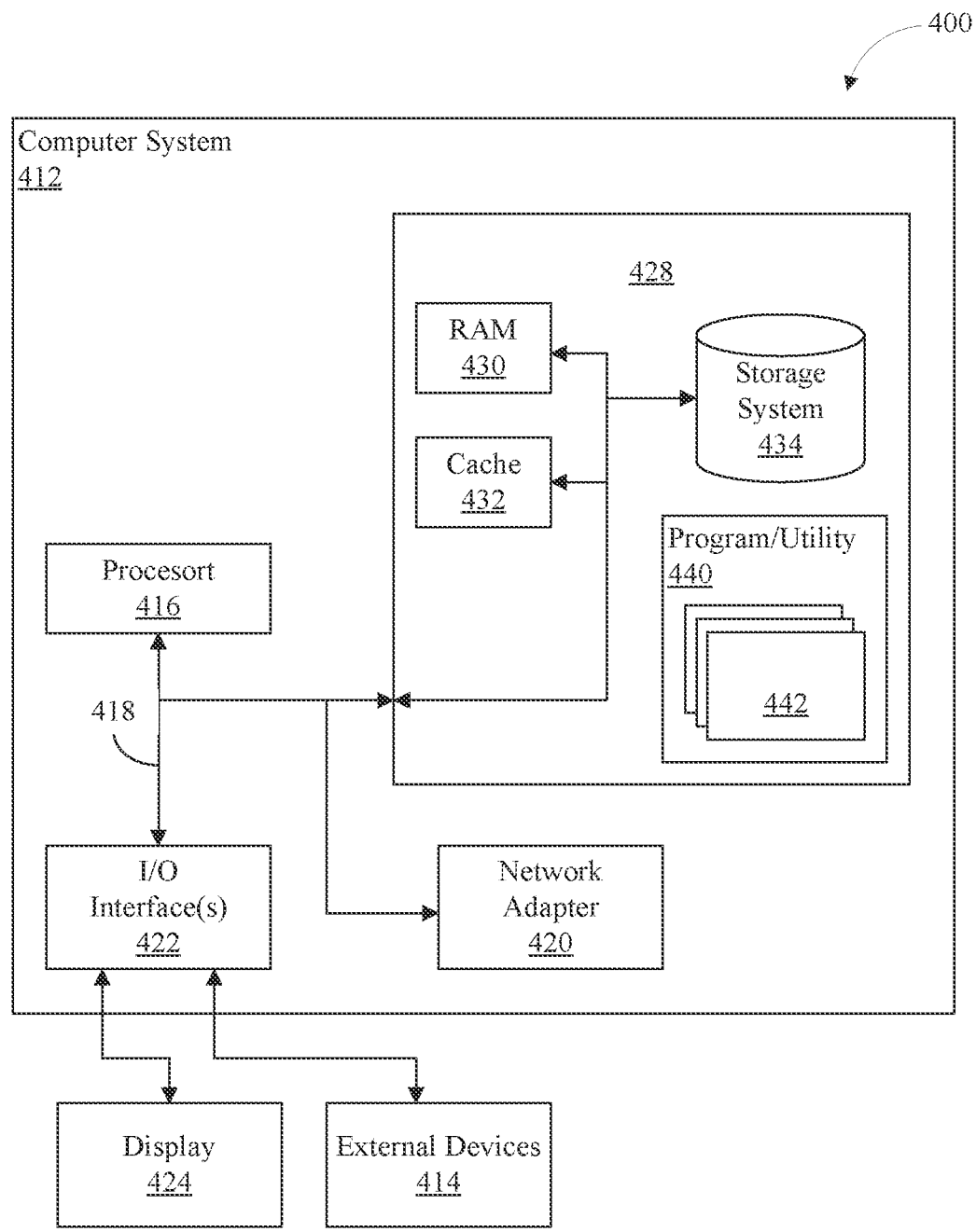
FIG. 4 is a block diagram illustrating an example of a computer hardware system for implementing the system of FIG. 1.

FIGS. 1 and 2, respectively, illustrate example VM file management system (system) 100 and methodology 200, which implements certain aspects of VM file management using version control of file-level snapshots. Illustratively, system 100 is implemented in virtual machine (VM) 102 hosted on computer system 104. VM 102 can be one of multiple VMs hosted on computer system 104. Computer system 104 can be a computer system such as computer system 412 that is part of a computing node (e.g., cloud-based server) such as computing node 400 (FIG. 4). Computer system 104 can be a server, a desktop computer, laptop, or any other such computer system.

VM 102 is supported by hypervisor 106. Hypervisor 106 creates virtual disk 108 for storing VM files processed by VM 102. The VM files include, for example, system files of the operating system of VM 102 as well as various application files created and/or modified by a VM user. System 100 includes access request monitor (ARM) 110 integrated in hypervisor 106. At block 202, ARM 110 detects an electronic request of a user to access VM 102. An example of a request of a user to access VM 102 is a user attempting to log in to VM 102. ARM 110 at block 204 searches pre-defined list 112, an electronic database of user identities and roles (e.g., VM user, IT administrator) to determine whether the user requesting access is identified within pre-defined list 112.

Pre-defined list 112 is a data structure for distinguishing one or more of a plurality of users from one or more other users of a VM. The data structure can comprise names, pre-defined codes (e.g., alpha-numeric), or other indicia identifying users that can instantiate, delete, and/or modify VM files. The data structure of pre-define list 112 can designate for each listed user one or more user attributes. The user attribute can indicate a user's role, such as IT administrator or other class of user.

Thus, pre-defined list 112 can identify users and/or their respective roles. For example, an identified user's role can be that of an ordinary VM user. An identified user's role, for example, can be that of IT administrator. A function of the IT administrator is to maintain the functionality, security, and the like of VM 102. System 100 is able to separate modifications of a VM file according to which modifications are made by different users in different roles. For example, a VM file modified by patches made by the IT administrator of VM 102 can be captured by one snapshot while modifications made to the same VM file by a VM user can be captured by another snapshot.

At block 206, in response to ARM 110 identifying the user within pre-defined list 112, snapshot generator 114 generates a snapshot prior to enabling modification of any VM files by the user requesting access to VM 102. The snapshot includes a user attribute indicating the role of the user for whom the snapshot is created and a timestamp indicating a time that the snapshot is created. The snapshot is initially empty. However, the snapshot is an active snapshot. Thus, during a VM session initiated by the user's request to access VM 102, one or more VM files can be modified by the user. Any VM file(s) modified in response to input from the user can be written to the snapshot. For example, a VM file (e.g., stored on virtual disk 108) can be identified in response to a read-access request, modified, and written to the snapshot in response to a write-access request. The snapshot is a file-level snapshot and thus can capture and save each VM file in the VM file's entirety, including those portions modified.

File-level snapshots can be implemented using different mechanisms with different file systems. In some arrangements, though not all, file-level snapshots of system 100 can comprise file-level overlay snapshots. File-level overlay snapshots can be implemented with a union mount file system (e.g., Linux® OverlayFS). An operating system implemented in computer system 104 can perform mounting to make files and directories available to users via a file system, with a mount point being the location at which a virtual file system is registered. The union mount file system implements overlays that combine multiple mount points to create a single directory structure containing separately sourced files and sub-directories. With overlays, a read/write partition of memory of computer system 104 can overlay a read-only partition. Overlays allow a read/write directory tree to be overlaid onto a read-only directory tree. In other arrangements using other operating systems and/or VM technologies, various mechanisms (e.g., Btrfs, EXT, XFS) can be used by system 100 to implement file-level snapshots.

At block 208, in response to modification of a VM file by the user, snapshot generator 114 saves the VM file, as modified, in the VM file's entirety to the snapshot generated in response ARM 110 identifying the user within pre-defined list 112. As an active snapshot, the snapshot supports both read and write operations and occupies the top layer of stack 116. Stack 116 is constructed by stack builder 118. Stack builder 118 adds as the top layer of stack 116 each snapshot newly generated by snapshot generator 114 in response to a user request to access VM 102. The snapshot at the top layer of stack 116 is active until a new snapshot is added to the top of stack 116. Snapshots at lower layers are read-only. A timestamp can indicate the time that the snapshot is created. Stack builder 118 can maintain a list of the snapshots saved to stack 116 and can arrange the stack according to timestamps associated with each snapshot on stack 116. Each layer of stack 116 comprises one or more file-level snapshots, each snapshot capturing a VM file, as modified by a particular user identified among the pre-defined list 112, in the VM file's entirety. A snapshot in the top layer is an active snapshot that supports both reading and writing data to VM files of the VM. Lower layer snapshots include read-only VM files.

Illustratively, stack 116 has four layers, but the stack 116 can have fewer or more than four layers, indeed many more in a typical scenario. The top layer of stack 116, Snapshot 3, is a snapshot that includes a VM file modification by a user identified by ARM 110 as IT Admin. The next layer down is Snapshot 2 created in response to a VM file modification by input from a user identified by ARM 110 as VM User. The next two layers down of stack 116 are, respectively, Snapshot 1 that captures a VM file modified by IT Admin and Snapshot 0 that captures the same or a different file modified by VM User. Again, stack 116 is merely illustrative. The number of layers and the number of snapshots at each layer, as well as the users corresponding to each snapshot can vary widely.

At block 210, a set of snapshots from stack 116 are selected by VM file selector 120 in response to a rollback request, and VM 102 is modified by merging the VM files belonging to the set of snapshots selected. VM file selector 120 selects the set of snapshots based on the user attribute of each snapshot. The user attribute indicates a role of the user for whom each snapshot was created and a timestamp indicating when each snapshot was created. For example, the selected snapshots can be selected based on corresponding user attributes indicating that each was created for a user identified as IT Admin, who can be the same user or several different users assigned the role of an IT administrator. Accordingly, VM file selector 120 selects the top layer snapshot (Snapshot 3 IT Admin) and the second snapshot (Snapshot 1 IT Admin) below the top layer. The selected snapshots each capture one or more VM files, in their entirety, that have been modified by IT Admin. The modifications can be, for example, made by installation of patches. If the same VM file is modified more than once and captured in multiple ones of the selected snapshots, only the most recent version of the VM file is selected by VM file selector 120.

At block 210, the VM is modified by merging the VM files captured by the snapshots selected by VM file selector 120.

The VM files are merged by VM file aggregator 122, which generates merged VM files 124. VM file aggregator 122 writes merged VM files 124 to virtual disk 108. The merged VM files can be those VM files modified by one or more designated users who, based on the user attribute according to which snapshots were selected by VM file selector 120, operate in the role of an IT administrator, for example. The modifying of VM 102 can comprise rolling back the VM by merging only the latest versions of VM file modifications (based on the timestamps indicating when each snapshot was created) made by one or more users operating as IT administrators. All other VM files of the VM can be retained in an original unmodified state. Portions of the data storage space associated with VM 102 can be reclaimed by deleting each of the snapshots upon completing modification of the VM through the merger of the VM files captured by the selected snapshots.

Figure 3:
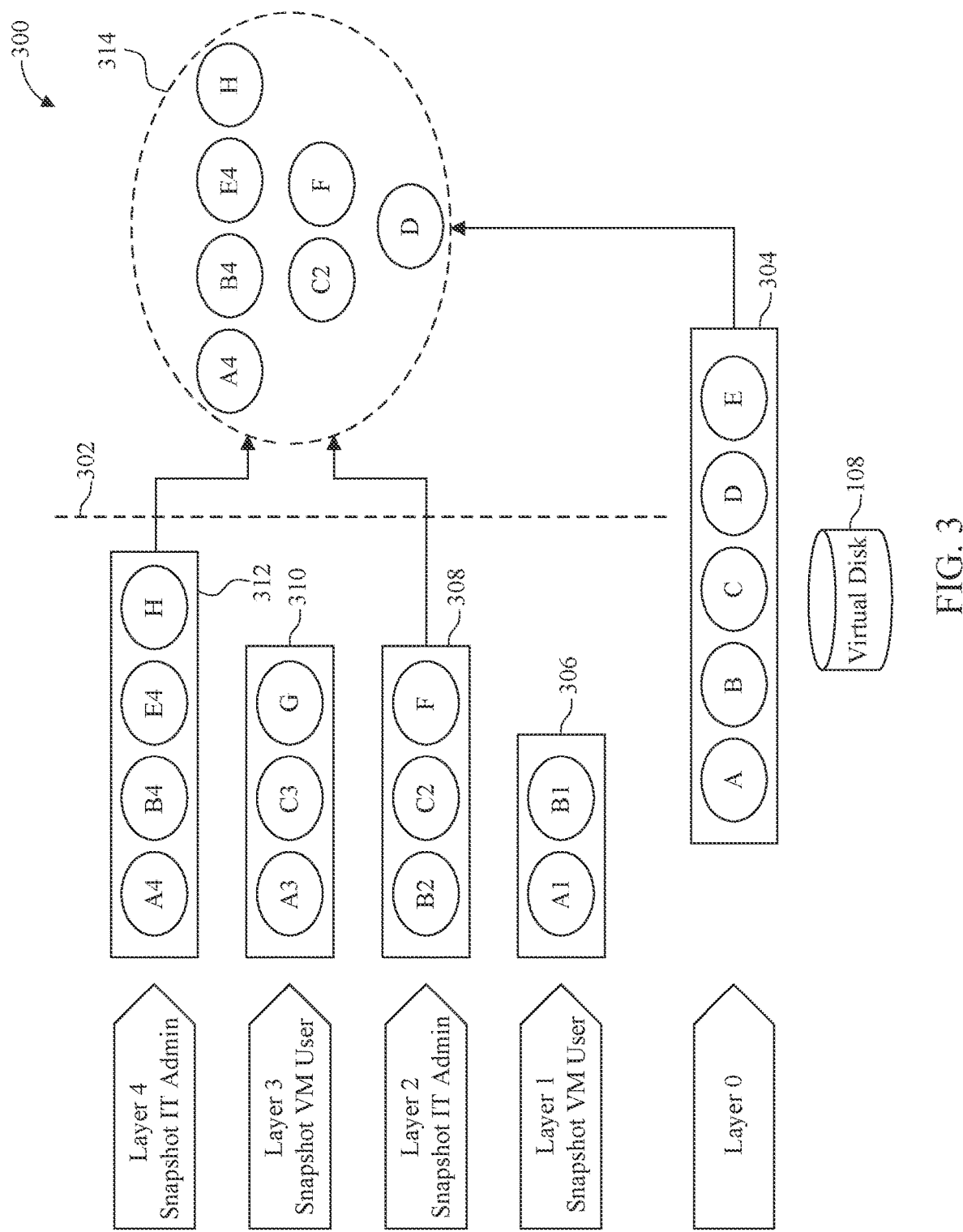
FIG. 3 is a block diagram illustrating certain operative aspects of a VM rollback performed using the example system for managing VM files depicted in FIG. 1.

FIG. 3 illustrates certain operative aspects 300 of a VM rollback and merger 302 performed using system 100. Initially, VM file set 304 is stored on virtual disk 108. VM file set 304 comprises as-yet-unmodified VM files A, B, C, D, and E. A modification of VM files A and B is made by a VM user during a session initiated by the user's request to access VM 102. Snapshot generator 114 generates snapshot 306, initially empty, prior to enabling modification of any VM files by the user and saves to snapshot 306 VM files as modified by the user, capturing versions A1 and B1 which snapshot generator 114 writes to snapshot 306 in their entireties. A modification of VM files B and C in response to input from an IT administrator prompts snapshot generator 114 to write the files, as modified, to snapshot 308, initially created in response an access request by the IT administrator. Snapshot 308 includes VM file versions B2 and C2. Note that B2 is a modification of VM file B (not B1, which resulted from the VM user's modification). The IT administrator also installs newly created VM file F, which is also written to snapshot 308. Input from the same or a different VM user modifying VM file version A1 (a prior modification by a VM user of original VM file A) and VM file C (not previously modified by a VM user) results in writes to snapshot 310, which includes VM file version A3 and C3, as well as newly created VM file G installed by the VM user. Note that A3 is a modification of VM file version A1, which as noted above resulted from a modification by the same or a different VM user.

Modifying input from the same or a different IT administrator prompts snapshot generator 114 to write modified VM files to snapshot 312. Snapshot 312 includes VM file versions A4, B4, and E4 and newly generated VM file H. A4 is a modification of original VM file A, which at this point had not been modified by a user in the role of IT administrator (though it had been modified twice by a VM user). B4 is a modification of version B2, which was previously modified by an IT administrator. B4 is the latest version and supersedes B2, which was written to snapshot 308 in response to a modification by the same or a different user identified as an IT administrator. To effect a rollback of the VM, VM file selector 120 selects snapshots 308 and 312, which based on identifications by ARM 110, are snapshots that capture modifications made by one or more IT administrators. By merging the VM files captured by snapshots corresponding to the IT administrator(s), the VM can be rolled back to the VM's original state without losing the patches introduced by the VM file modifications made by the one or more users in the role of an IT administrator. This obviates the need to re-install the patches after the rollback, as is typically necessary when using block-level snapshots rather than the file-level snapshots of system 100. File aggregator 122 merges the latest version of VM files from the selected snapshots with original unmodified VM files stored on virtual disk 108. The rollback generates VM file set 314, which comprises A4, B4, C2, D, E4, F, and H. The rollback completes with VM file set 314 being committed to virtual disk 108. Once the rollback is performed, all snapshots can be deleted for further freeing up data storage space.

FIG. 4 illustrates a schematic of an example of a computing node 400. In one or more arrangements, computing node 400 is an example of a suitable cloud computing node. Computing node 400 is not intended to suggest any limitation as to the scope of use or functionality of arrangements of the invention described herein. Computing node 400 is capable of performing any of the functionality described within this disclosure.

Computing node 400 includes a computer system 412, which is operational with numerous other general-purpose or special-purpose computing system environments or configurations. Examples of well-known computing systems, environments, and/or configurations that may be suitable for use with computer system 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 412 may be described in the general context of computer system-executable instructions, such as program modules, being executed by a computer system. Generally, program modules may include routines, programs, objects, components, logic, data structures, and so on that perform particular tasks or implement particular abstract data types. Computer system 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system 412 is shown in the form of a general-purpose computing device. The components of computer system 412 may include, but are not limited to, one or more processors 416, a memory 428, and a bus 418 that couples various system components including memory 428 to processor 416. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 418 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 412 typically includes a variety of computer system-readable media. Such media may be any available media that is accessible by computer system 412, and may include both volatile and non-volatile media, removable and non-removable media.

Memory 428 may include computer system readable media in the form of volatile memory, such as random-access memory (RAM) 430 and/or cache memory 432. Computer system 412 may further include other removable/non-removable, volatile/non-volatile computer system storage media. By way of example, storage system 434 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of arrangements of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of arrangements of the invention as described herein. For example, one or more of the program modules may include system 100 for VM file management or portions thereof.

Program/utility 440 is executable by processor 416. Program/utility 440 and any data items used, generated, and/or operated upon by computer system 412 are functional data structures that impart functionality when employed by computer system 412. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 412 may also communicate with one or more external devices 414 such as a keyboard, a pointing device, a display 424, etc.; one or more devices that enable a user to interact with computer system 412; and/or any devices (e.g., network card, modem, etc.) that enable computer system 412 to communicate with one or more other computing devices. Such communication can occur via input/output (I/O) interfaces 422. Still, computer system 412 can communicate with one or more networks such as a local area network (LAN), a general wide area network (WAN), and/or a public network (e.g., the Internet) via network adapter 420. As depicted, network adapter 420 communicates with the other components of computer system 412 via bus 418. It should be understood that although not shown, other hardware and/or software components could be used in conjunction with computer system 412. Examples, include, but are not limited to: microcode, device drivers, redundant processing units, external disk drive arrays, RAID systems, tape drives, and data archival storage systems, etc.

While computing node 400 is used to illustrate an example of a cloud computing node, it should be appreciated that a computer system using an architecture the same as or similar to that described in connection with FIG. 4 may be used in a non-cloud computing implementation to perform the various operations described herein. In this regard, the example arrangements described herein are not intended to be limited to a cloud computing environment.

Computing node 400 is an example of computer hardware. Computing node 400 may include fewer components than shown or additional components not illustrated in FIG. 4 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

It is expressly noted that although this disclosure includes a detailed description of cloud computing, implementations of the teachings recited herein are not limited to a cloud computing environment. Rather, arrangements of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
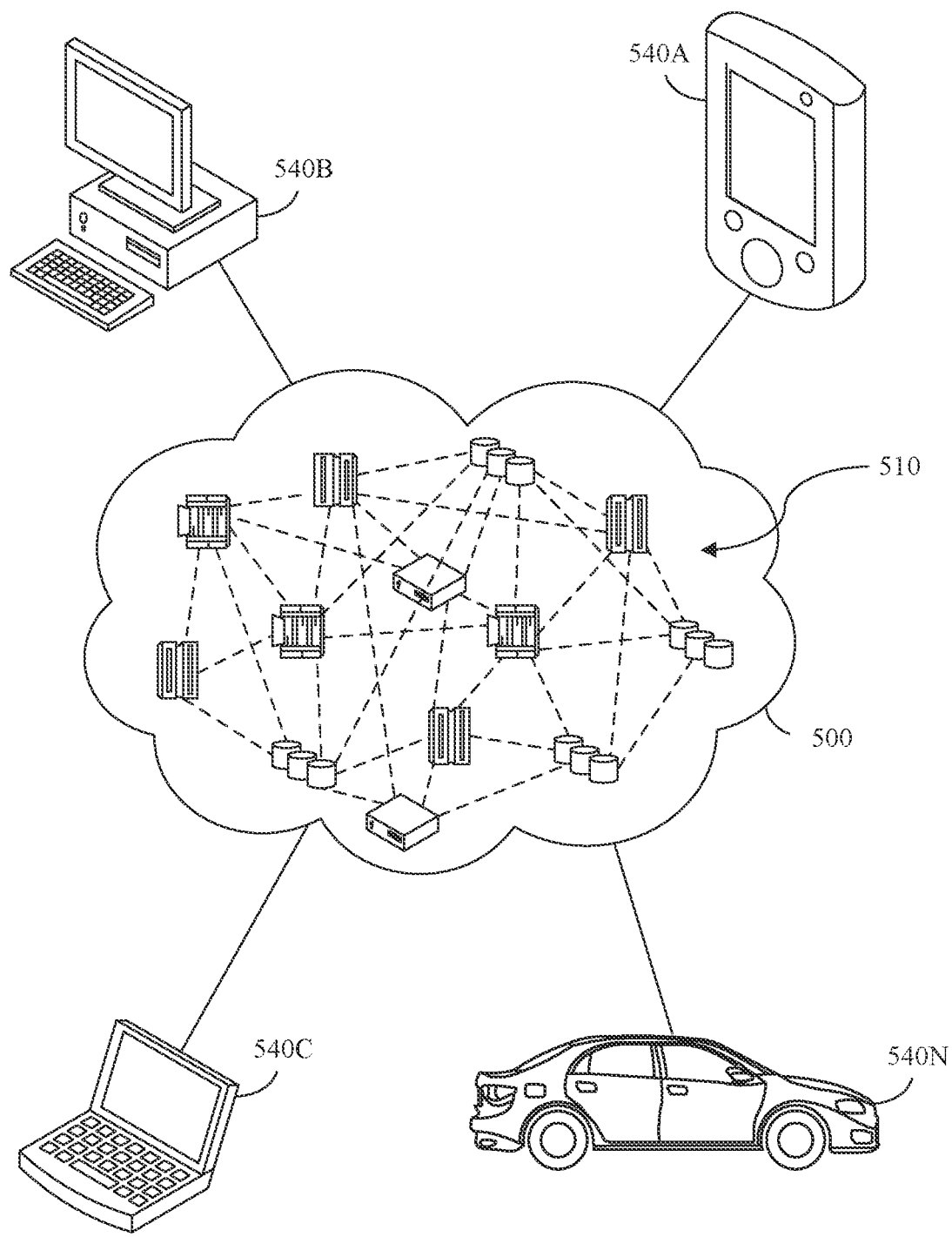
FIG. 5 is a block diagram illustrating an example cloud computing environment.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 540a, desktop computer 540b, laptop computer 540c, and/or automobile computer system 540n may communicate. Computing nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 540a-n shown in FIG. 5 are intended to be illustrative only and that computing nodes 510 and cloud computing environment 500 can communicate with any type of computerized device over any type of network and/or network addressable connection (e.g., using a web browser).

Figure 6:
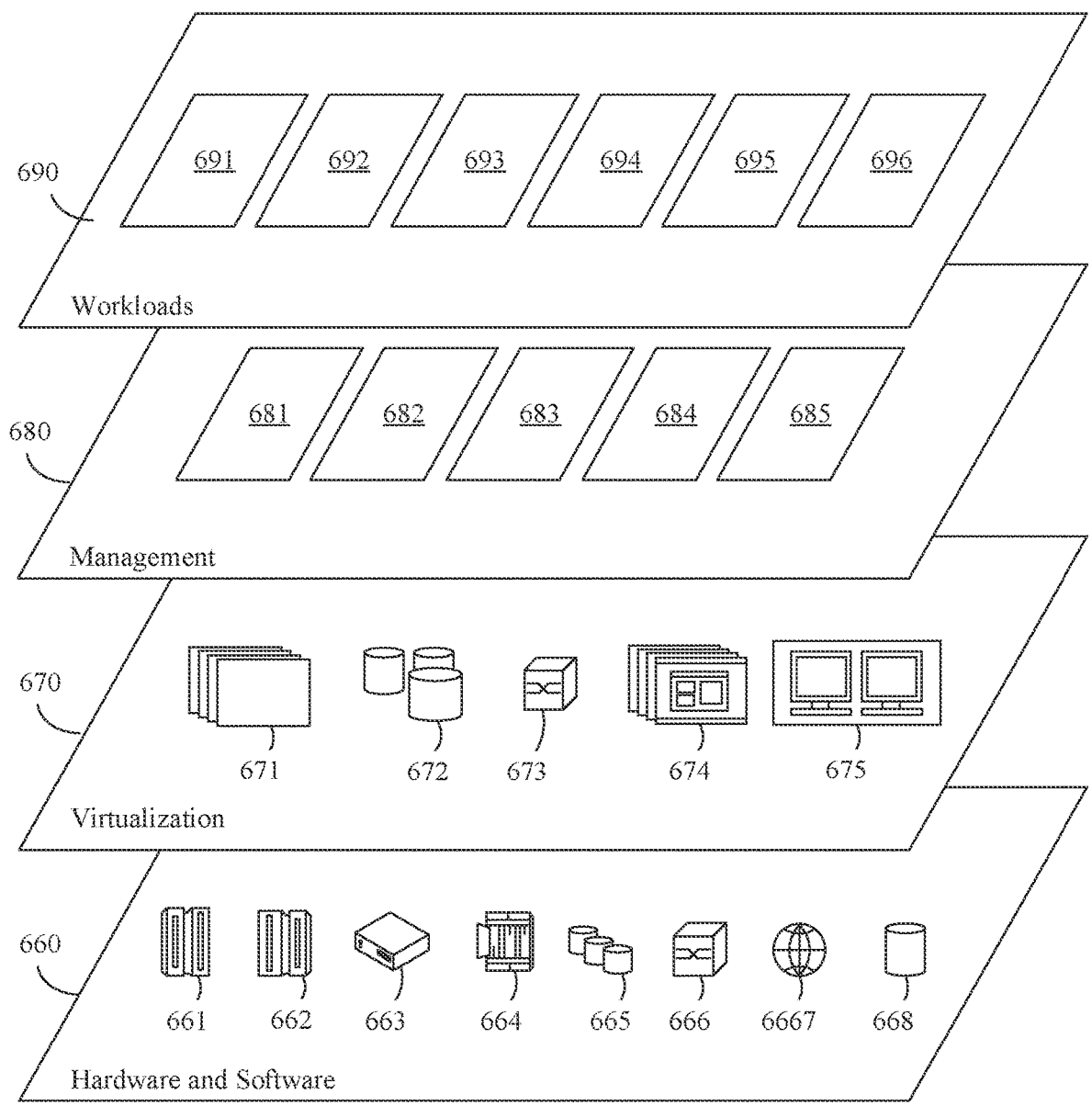
FIG. 6 is block diagram illustrating example abstraction model layers.

Referring now to FIG. 6, a set of functional abstraction layers provided by cloud computing environment 500 (FIG. 5) is shown. It should be understood in advance that the components, layers, and functions shown in FIG. 6 are intended to be illustrative only and arrangements of the invention are not limited thereto. As depicted, the following layers and corresponding functions are provided:

Hardware and software layer 660 includes hardware and software components. Examples of hardware components include mainframes 661; RISC (Reduced Instruction Set Computer) architecture-based servers 662; servers 663; blade servers 664; storage devices 665; and networks and networking components 666. In some arrangements, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and VM file management system 696.

The terminology used herein is for the purpose of describing particular arrangements only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one arrangement," "an arrangement," "in one or more arrangements," "in particular arrangements," or similar language mean that a particular feature, structure, or characteristic described in connection with the arrangement is included in at least one arrangement described within this disclosure. Thus, appearances of the aforementioned phrases and/or similar language throughout this disclosure may, but do not necessarily, all refer to the same arrangement.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the terms "user," "requestor," "developer," and "IT administrator each refer to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some arrangements, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to arrangements of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various arrangements of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various arrangements of the present invention have been presented for purposes of illustration and are not intended to be exhaustive or limited to the arrangements disclosed. Many modifications and variations will be apparent to those of ordinary skill in the art without departing from the scope and spirit of the described arrangements. The terminology used herein was chosen to best explain the principles of the arrangements, the practical application or technical improvement over technologies found in the marketplace, or to enable others of ordinary skill in the art to understand the arrangements disclosed herein.

What is claimed is:

1. A computer implemented method by a virtual machine (VM) file management system for managing a VM executing on an operating system (OS), comprising:
   generating, for a VM file processed by the VM, a series of a plurality of file-level snapshots in a stack of snapshots, wherein each of the plurality of file-level snapshots are responsive to a modification of the VM file by a respective user and include:
      a time attribute indicating a time when a respective file-level snapshot was created,
      a specific version of the VM file as modified at the time indicated by the time attribute, and
      a user attribute indicating a role of the respective user associated with the modification;
   receiving a request to merge files, the request to merge files including a selected role; and
   merging versions of VM files only for the selected role to generate a modified VM file that acts as a current VM file to be processed by the VM, wherein
   the plurality of file-level snapshots include a plurality of different roles respectively having a plurality of different privileges for modifying the VM file, and
   the merging versions
      rolls back those one or more versions of VM files associated with the selected role, and
      does not roll back those one or more versions of VM files not associated with the selected role.

2. The method of claim 1, wherein
the VM file includes all VM files that support executing of the VM by the OS.

3. The method of claim 2, wherein
the VM file includes OS files supporting the OS.

4. The method of claim 1, wherein
the selected role refers to a specific user or a class of users.

5. The method of claim 1, wherein
one of the plurality of different roles is IT administrator that is granted predefined privileges to modify OS files supporting the OS.

6. The method of claim 5, wherein
the selected role is not the IT administrator, and
the merging does not roll back patches previously implemented by the IT administrator.

7. The method of claim 1, wherein
the stack of snapshots includes:
   a top layer that includes an active snapshot that supports read and write data operations and
   lower layers that respectively include prior active snapshots that support a read-only data operation.

8. The method of claim 7, wherein
the active snapshot includes a latest version of the VM file.

9. A computer system including a virtual machine (VM) file management system for managing a VM executing on an operating system (OS), comprising:
   a hardware processor configured to initiate the following executable operations:
      generating, for a VM file processed by the VM, a series of a plurality of file-level snapshots in a stack of snapshots, wherein each of the plurality of file-level snapshots are responsive to a modification of the VM file by a respective user and include:

a time attribute indicating a time when a respective file-level snapshot was created, a specific version of the VM file as modified at the time indicated by the time attribute, and a user attribute indicating a role of the respective user associated with the modification;

receiving a request to merge files, the request to merge files including a selected role; and merging versions of VM files only for the selected role to generate a modified VM file that acts as a current VM file to be processed by the VM, wherein the plurality of file-level snapshots include a plurality of different roles respectively having a plurality of different privileges for modifying the VM file, and the merging versions rolls back those one or more versions of VM files associated with the selected role, and does not roll back those one or more versions of VM files not associated with the selected role.

10. The system of claim 9, wherein
the VM file includes all VM files that support executing of the VM by the OS.

11. The system of claim 10, wherein
the VM file includes OS files supporting the OS.

12. The system of claim 9, wherein
the selected role refers to a specific user or a class of users.

13. The system of claim 9, wherein
one of the plurality of different roles is IT administrator that is granted predefined privileges to modify OS files supporting the OS.

14. The system of claim 13, wherein
the selected role is not the IT administrator, and
the merging does not roll back patches previously implemented by the IT administrator.

15. The system of claim 9, wherein
the stack of snapshots includes:
   a top layer that includes an active snapshot that supports read and write data operations and
   lower layers that respectively include prior active snapshots that support a read-only data operation.

16. The system of claim 15, wherein
the active snapshot includes a latest version of the VM file.

17. A computer program product, comprising
computer-readable storage medium having stored thereon program instructions for implementing virtual machine (VM) file management system for managing a VM executing on an operating system (OS),
the program instructions, which when executed by a computer hardware system, cause the computer hardware system to perform:

generating, for a VM file processed by the VM, a series of a plurality of file-level snapshots in a stack of snapshots, wherein each of the plurality of file-level snapshots are responsive to a modification of the VM file by a respective user and include:

a time attribute indicating a time when a respective file-level snapshot was created, a specific version of the VM file as modified at the time indicated by the time attribute, and a user attribute indicating a role of the respective user associated with the modification;

receiving a request to merge files, the request to merge files including a selected role; and merging versions of VM files only for the selected role to generate a modified VM file that acts as a current VM file to be processed by the VM, wherein the plurality of file-level snapshots include a plurality of different roles respectively having a plurality of different privileges for modifying the VM file, and the merging versions rolls back those one or more versions of VM files associated with the selected role, and does not roll back those one or more versions of VM files not associated with the selected role.

18. The computer program product of claim 17, wherein
the VM file includes all VM files that support executing of the VM by the OS, and
the VM file includes OS files supporting the OS.

19. The computer program product of claim 17, wherein
one of the plurality of different roles is IT administrator that is granted predefined privileges to modify OS files supporting the OS,
the selected role is not the IT administrator, and
the merging does not roll back patches previously implemented by the IT administrator.

20. The computer program product of claim 17, wherein
the stack of snapshots includes:
   a top layer that includes an active snapshot that supports read and write data operations and
   lower layers that respectively include prior active snapshots that support a read-only data operation, and
the active snapshot includes a latest version of the VM file.

* * * * *